W. A. ROEBLING.
Improvement in Rubber Filling for the Grooves of Transmission Wheels.

No. 124,764.  Patented March 19, 1872.

Witnesses:
Chas. Nida
Geo. W. Mabee

Inventor:
W. A. Roebling
PER Munn & Co
Attorneys.

UNITED STATES PATENT OFFICE.

WASHINGTON A. ROEBLING, OF TRENTON, NEW JERSEY.

IMPROVEMENT IN RUBBER FILLINGS FOR THE GROOVES OF TRANSMISSION-WHEELS.

Specification forming part of Letters Patent No. 124,764, dated March 19, 1872.

Specification describing a new and Improved Rubber Filling for Grooves of Transmission-Wheels, invented by WASHINGTON A. ROEBLING, of Trenton, in the county of Mercer and State of New Jersey.

This invention relates to a rubber filling for lining the grooves of cast-iron wheels which run at a great velocity, and are principally used for the purpose of transmitting power to distant points by means of wire ropes. The same filling may, however, be used for other grooved wheels running at a slower speed, and for different purposes.

Figure 1:
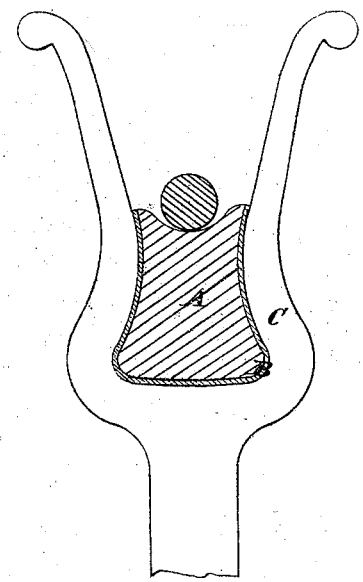
Figure 2:
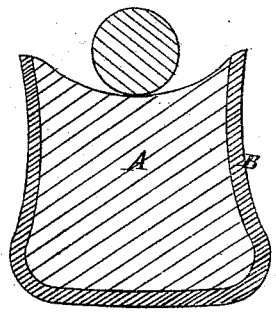

In Figure 1 is represented the section of the rim of such a transmission-wheel and my improved filling. Fig. 2 represents the section of a piece of my improved rubber filling, of full size, as made for a wheel of five feet in diameter, said piece varying in length from an inch to several feet.

This rubber filling is composed of a core of hard rubber, A, surrounded by a skin of soft rubber, B, about one-eighth of an inch thick, more or less. C is the wheel. This coat of soft rubber extends along the two sides and the bottom, and is omitted on top, where the rope rests. By means of this combination two difficulties are overcome. One is the difficulty of inserting the filling into the dovetailed groove and yet have it large enough to fill the groove completely and not be thrown out by the centrifugal force, which is very great, owing to the high velocity of the wheels. The other difficulty is to find a material hard enough on top to resist the wear of a rapidly-running rope, and, at the same time, have the necessary velocity. This is accomplished by surrounding a core of hard rubber by a skin of soft rubber, which has elasticity enough to allow of its being driven into the groove and of expanding sufficiently afterward to hold it there, and yet is hard enough to resist the wear of the rope.

I do not claim a rubber filling in general, nor the peculiar shape of the rubber; nor do I claim the combining of hard and soft rubber in general; but What I do claim, and desire to secure by Letters Patent, is—

The combination of a skin of soft rubber on a core of hard rubber in the filling used for lining the grooves of transmission or other rope wheels, and made of any length, as described, and for the purpose set forth.

W. A. ROEBLING.

Witnesses:
T. B. MOSHER,
GEO. W. MABEE.